United States Patent
Maeda et al.

(10) Patent No.: US 6,805,214 B2
(45) Date of Patent: Oct. 19, 2004

(54) BREATHER SYSTEM AND STRADDLE-TYPE FOUR WHEELED ALL TERRAIN VEHICLE COMPRISING BREATHER SYSTEM

(75) Inventors: Kazuhiro Maeda, Akashi (JP); Gaku Yoshimura, Akashi (JP)

(73) Assignee: Kawasaki Jukogyo Kabushiki Kaisha, Kobe (JP)

(*) Notice: Subject to any disclaimer, the term of this patent is extended or adjusted under 35 U.S.C. 154(b) by 86 days.

(21) Appl. No.: 10/059,941

(22) Filed: Jan. 28, 2002

(65) Prior Publication Data

US 2002/0112907 A1 Aug. 22, 2002

(30) Foreign Application Priority Data

Jan. 31, 2001 (JP) ........................................ 2001-023826

(51) Int. Cl.⁷ .............................................. B60K 15/00
(52) U.S. Cl. ...................... 180/69.4; 180/908; 180/233; 180/220; 180/4.14
(58) Field of Search ............................... 180/908, 69.4, 180/69.5, 233; 280/834; D12/218; 123/516, 518–520; 220/4.14

(56) References Cited

U.S. PATENT DOCUMENTS

| | | | | |
|---|---|---|---|---|
| 4,799,565 A | * | 1/1989 | Handa et al. ............... | 180/69.4 |
| 5,392,804 A | * | 2/1995 | Kondo et al. ............... | 137/202 |
| 5,474,048 A | * | 12/1995 | Yamazaki et al. .......... | 123/519 |
| 5,687,778 A | * | 11/1997 | Harris ......................... | 141/59 |
| 6,029,635 A | * | 2/2000 | Sekine et al. .............. | 123/516 |
| 6,276,387 B1 | * | 8/2001 | Pachciarz et al. .......... | 137/43 |
| 6,405,747 B1 | * | 6/2002 | King et al. ................. | 137/202 |

FOREIGN PATENT DOCUMENTS

| | | | | |
|---|---|---|---|---|
| JP | S48-108010 | | 12/1973 | |
| JP | 02-011483 | | 1/1990 | |
| JP | 11-127658 | | 5/1999 | |
| JP | 2000-211380 | * | 8/2000 | ......... B60K/15/035 |
| JP | 2001-287552 | * | 10/2001 | ......... B60K/15/035 |

* cited by examiner

*Primary Examiner*—Lesley D. Morris
*Assistant Examiner*—Matthew Luby
(74) *Attorney, Agent, or Firm*—Kolisch Hartwell, P.C.

(57) ABSTRACT

Disclosed is a breather system for a fuel tank reliably performing a function of a breather when a vehicle is inclined to the right or to the left and a straddle-type four wheeled all terrain vehicle comprising the breather system in which the fuel tank is provided below a seat, and a fuel inlet and a tank cap covering the fuel inlet is protruded from a rear fender laterally of the seat. The breather system has two breather openings provided in the fuel tank, breather hoses respectively connected to the breather openings, a T-shape joint integrally connecting the breather hoses, and a check valve connected to an ambient side of the T-shape joint, and the two breather openings are provided on the right and left sides of the fuel tank so as to be spaced apart from each other.

14 Claims, 7 Drawing Sheets

BREATHER SYSTEM AND STRADDLE-TYPE FOUR WHEELED ALL TERRAIN VEHICLE COMPRISING BREATHER SYSTEM

BACKGROUND OF THE INVENTION

1. Field of the Invention

The present invention relates to a breather system for a fuel tank capable of reliably functioning when a vehicle is inclined to the right or to the left, and a straddle-type four wheeled all terrain vehicle comprising the breather system.

2. Description of the Related Art

In general, a straddle-type four wheeled all terrain vehicle is a four-wheeled motorcycle called an "all terrain vehicle (ATV)". Since this type of vehicle is capable of stably traveling over sandy soil, rough terrain, and wet terrain and carrying a great deal of luggage and various equipment, it is utilized in various uses including leisure, sport activities, border patrols, etc.

The all terrain vehicle travels on the above-described terrains, and therefore, dust, water splash or the like is often generated during traveling. Also, the vehicle sometimes travels across puddles, streams, or the like. Since it is highly probable that the dust, water, or the like enters an air intake part having an intake port (ambient side opening) such as an air cleaner, it is desirable to provide the intake part at the highest possible position of the vehicle's body.

In addition, in some all terrain vehicles on which a V-type engine is mounted, the air cleaner is placed above the engine, i.e., at a position at which the fuel tank has been conventionally placed, and for this reason the fuel tank is placed below a seat that a rider straddles and between two rear wheels.

In the constitution in which the fuel tank is placed above the engine, since fuel from the fuel tank is supplied to a carburetor by gravity, a pump for this supply is unnecessary. However, in the above-described constitution in which the fuel tank is placed below the seat, the fuel tank is inevitably located at a position substantially as high as or lower than the carburetor. Accordingly, in this constitution, there is a need for a fuel pump.

It is required that a fuel inlet of the fuel tank be located so as to be accessible from outside. In the constitution in which the fuel tank is located below the seat, the fuel inlet and a tank cap covering it are exposed from a rear fender by the side of the seat.

In the fuel tank, it is necessary to keep its internal pressure constant for the purpose of stably supplying the fuel to the engine through the carburetor. In a general vehicle, this can be easily achieved by providing a small opening in the tank cap. However, in case of the all terrain vehicle traveling on the above-described terrains, the fuel in the fuel tank might leak from the opening due to vibration during traveling, inclination of the vehicle body or the like.

Under these circumstances, the prevention of leakage of the fuel and the stable supply of ambient air into the fuel tank have been challenging tasks to the breather system of the fuel tank. By way of example, as disclosed in Japanese Patent No. 2795649, a breather hose is connected to the opening of the tank cap and an ambient-side opening of the breather hose end is fixed at a position of the vehicle body (e.g., handle) higher than the tank cap opening.

In the constitution in which the fuel tank is placed below the seat and the tank cap is provided on one of right and left sides of the seat, when the vehicle is inclined toward the tank cap side, the fuel runs into the corresponding breather hose, thereby causing the function of the breather to be unreliably performed.

SUMMARY OF THE INVENTION

The present invention addresses the above-described condition, and an object of the present invention is to provide a breather system for a fuel tank capable of functioning even if a straddle-type four wheeled all terrain vehicle in which a fuel tank is placed below the seat is inclined to the right or to the left, and a straddle-type four wheeled all terrain vehicle comprising the breather system.

To addresses the above-described conditions, according to the present invention, there is provided a breather system for a fuel tank comprising: a plurality of openings provided in the fuel tank; breather hoses respectively connected to the openings; a collecting pipe integrally connecting the breather hoses; and a check valve connected to an ambient side of the collecting pipe, wherein the plurality of openings are provided on opposite sides of the fuel tank so as to be spaced apart from each other.

According to the present invention, the plurality of breather openings are provided in the fuel tank and the breather hoses respectively connected to these openings are placed on the opposite sides of the fuel tank so as to be spaced apart from each other. Therefore, even if the vehicle is inclined to any of the opposite sides, the breather hose on the other side can be reliably operated.

In the present invention, the plurality of breather openings need to be spaced apart from each other but a distance between them or the like is not limited. It is desirable to place these openings in a space which is not occupied by the fuel in the fuel tank, that is, a space which contains air (basically at the highest position of the fuel tank) according to the degree of inclination of the fuel tank. Since there is sometimes provided an inflated space, for example, so-called air reservoir, depending on the shape of the fuel tank, it is advantageous in the present invention that the breather openings are placed at the air reservoir in which air is reserved substantially all the time regardless of such inclination.

It should be noted that the breather hose may be connected to a tank cap of the fuel tank.

Since the breather hoses respectively connected to the breather openings are integrally connected by means of the collecting pipe and the ambient side of the collecting pipe is connected to the check valve, the fuel tank having the plurality of openings can be embodied with a simple structure. The space in the fuel tank communicates with ambient via one or both of the breather hoses when the internal pressure of the fuel tank becomes positive or negative, thereby keeping the internal pressure of the fuel tank substantially constant.

Since the plurality of breather hoses are integrally connected and connected to the check valve, only one check valve is needed.

A catch tank having a predetermined space inside thereof may be interposed between the collecting pipe and the check valve and provided integrally with the check valve. In this case, even if the internal pressure of the fuel tank is increased to cause the fuel to be pushed out from the fuel tank through the breather hose, the fuel is temporarily stored in the catch tank without running to the outside. Moreover, the catch tank and the check valve can be compactly arranged together.

In this case, by positioning the catch tank to be higher than the fuel tank or the breather openings to which the breather hoses are connected, the fuel stored in the catch tank can be returned into the fuel tank by gravity when the internal pressure of the fuel tank is returned to normal.

Since the catch tank is directly connected to the check valve, a piping such as a connecting hose between them becomes unnecessary and the breather system can be simplified.

According to the present invention, there is also provided a straddle-type four wheeled all terrain vehicle, comprising: a vehicle body frame constituting the vehicle's body; a straddle-type seat mounted to an upper portion of the frame; a fuel tank placed below the seat; and a breather system for the fuel tank, wherein the breather system includes: a plurality of breather openings provided in an upper portion of the fuel tank such that they are spaced apart from each other on right and left sides; breather hoses respectively connected to the breather openings; and a collecting pipe integrally connecting the breather hoses; and a check valve connected to an ambient side of the collecting pipe.

According to the present invention, the plurality of breather openings are provided in the fuel tank below the seat (in particular, in a space surrounded by the upper frames, the lower frames, and the rear upper frames, in case of the frame structure of the double-cradle type), and the breather hoses respectively connected to these openings are provided in the fuel tank such that they are spaced apart from each other on the right and left sides. Therefore, in the straddle-type four wheeled all terrain vehicle in which the fuel tank is placed below the seat and the fuel inlet is provided on one of right and left sides of the seat, even if the vehicle body is inclined to the right or to the left, the breather can be reliably functioned.

In this case, by providing the breather openings in a part of the fuel tank except the tank cap, the breather hoses connected to these openings can be easily placed inside of the rear fender not interfering with the rider.

In this case, since the breather hoses respectively connected to the breather openings are integrally connected by means of the collecting pipe (e.g., T-shape point) and the ambient-side of the collecting pipe is connected to the check valve, the fuel tank having the plurality of breather openings can be realized with a simple structure. When the internal pressure of the fuel tank becomes positive or negative, one or both of the breather hoses allow a space in the fuel tank to communicate with ambient, thereby keeping the internal pressure of the fuel tank substantially constant.

The ambient-side opening end of the check valve may communicate with a space in the pipe-shaped frame constituting the vehicle body so as to be opened in the ambient air. In general, the inside of the vehicle body frame is a clean room having a relatively large space closed by welding, which is suitable as an air intake passage. By making the ambient-side opening end of the check valve communicate with the space inside the frame, even if the fuel exceeding the capacity of the catch tank goes through the check valve, this fuel is stored in the frame without contaminating a road surface or the like. Needless to say, to open the space inside the frame with which the ambient-side opening end of the check valve communicate in the ambient air, the opening needs to be provided at any position of the frame.

An insertion portion with barb for preventing disengagement from the frame may be provided at the ambient-side opening end (in general, connected by a suitable breather hose) of the check valve which is connected to the frame.

It should be appreciated that the pipe-shaped frame need not be a frame relating to a structure of the vehicle body such as the body frame but may be a suitable frame provided in the vehicle. Preferably, the pipe-shaped frame is an upper frame that forms an upper portion of the body frame of a double-cradle type body frame and supports the seat. The frame is not limited to a pipe frame having a circular cross section but may be frames having cross sections of various shapes and a suitable space inside thereof.

In a case where the fuel inlet is provided on one of right and left sides of the fuel tank, the all terrain vehicle may be constituted as described below for the purpose of reliably functioning the breather when the vehicle is inclined to the right or to the left.

For example, the fuel inlet may be provided in a portion formed by upwardly extending part of the upper surface of the fuel tank such that an air reservoir is provided below the fuel inlet. A first breather opening may be formed in the air reservoir and connected to the first breather hose. A second breather opening may be formed in the upper face of the fuel tank on the opposite side of the first opening and connected to a second breather hose.

The check valve may be of various types. In order to prevent mixing of the fuel from the fuel tank with the ambient air, preferably, a check valve having two chambers, in which an air-intake side and a discharge side are independently formed for introducing the air between the inside of the tank and the ambient, is employed.

The above and further objects and features of the invention will more fully be apparent from the following detailed description with accompanying drawings.

DETAILED DESCRIPTION OF THE PREFERRED EMBODIMENT

Hereinafter, an example of a breather system for a fuel tank mounted on a straddle-type four wheeled all terrain vehicle will be described with reference to drawings as an embodiment of the breather system according to the present invention. The breather system of the present invention is not limited to that applied to the straddle-type four wheeled all terrain vehicle but is applicable to various types of all terrain vehicles.

Figure 1:
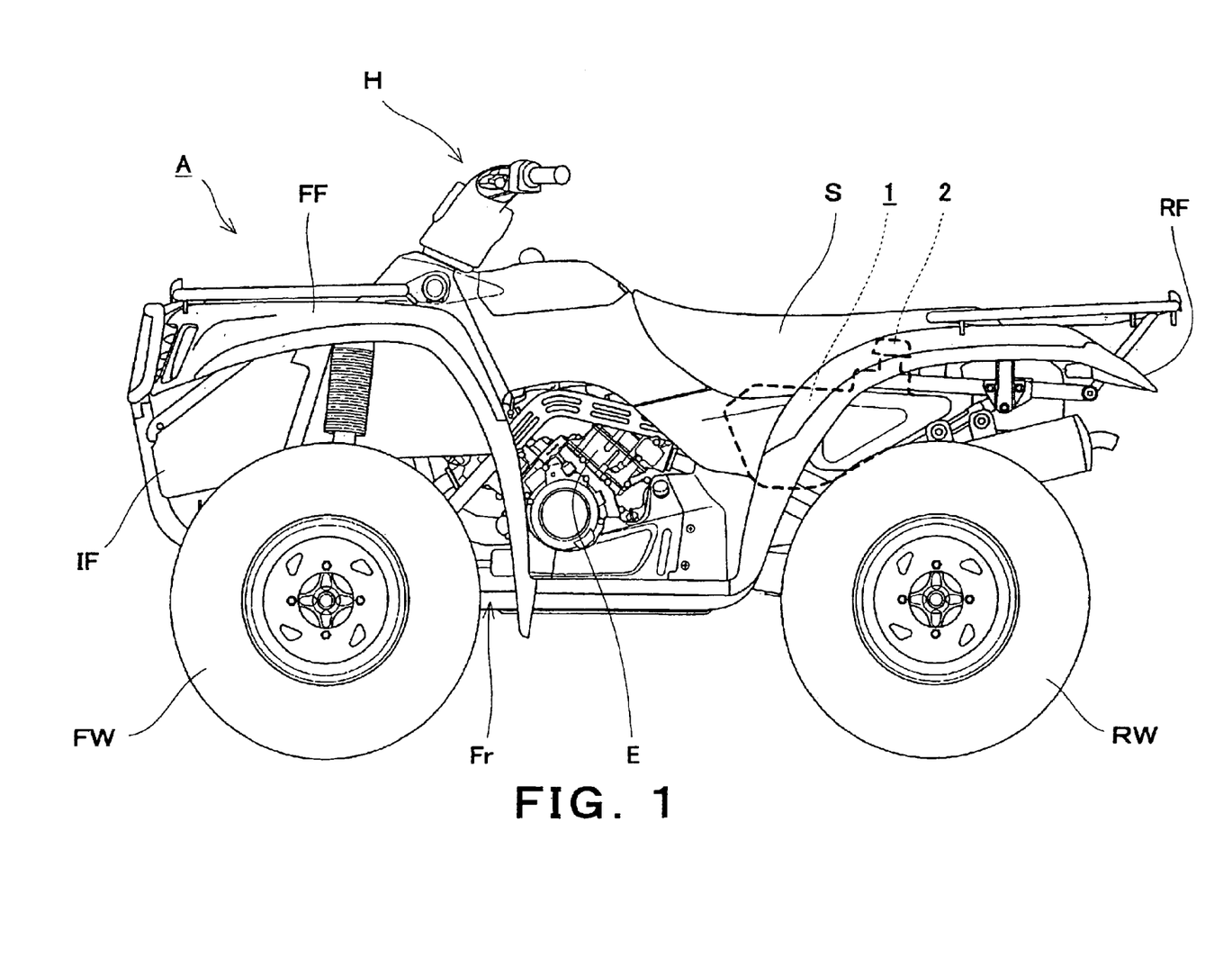
FIG. 1 is a side view showing an entire configuration of a straddle-type four wheeled all terrain vehicle according to an embodiment of the present invention.
Figure 2:
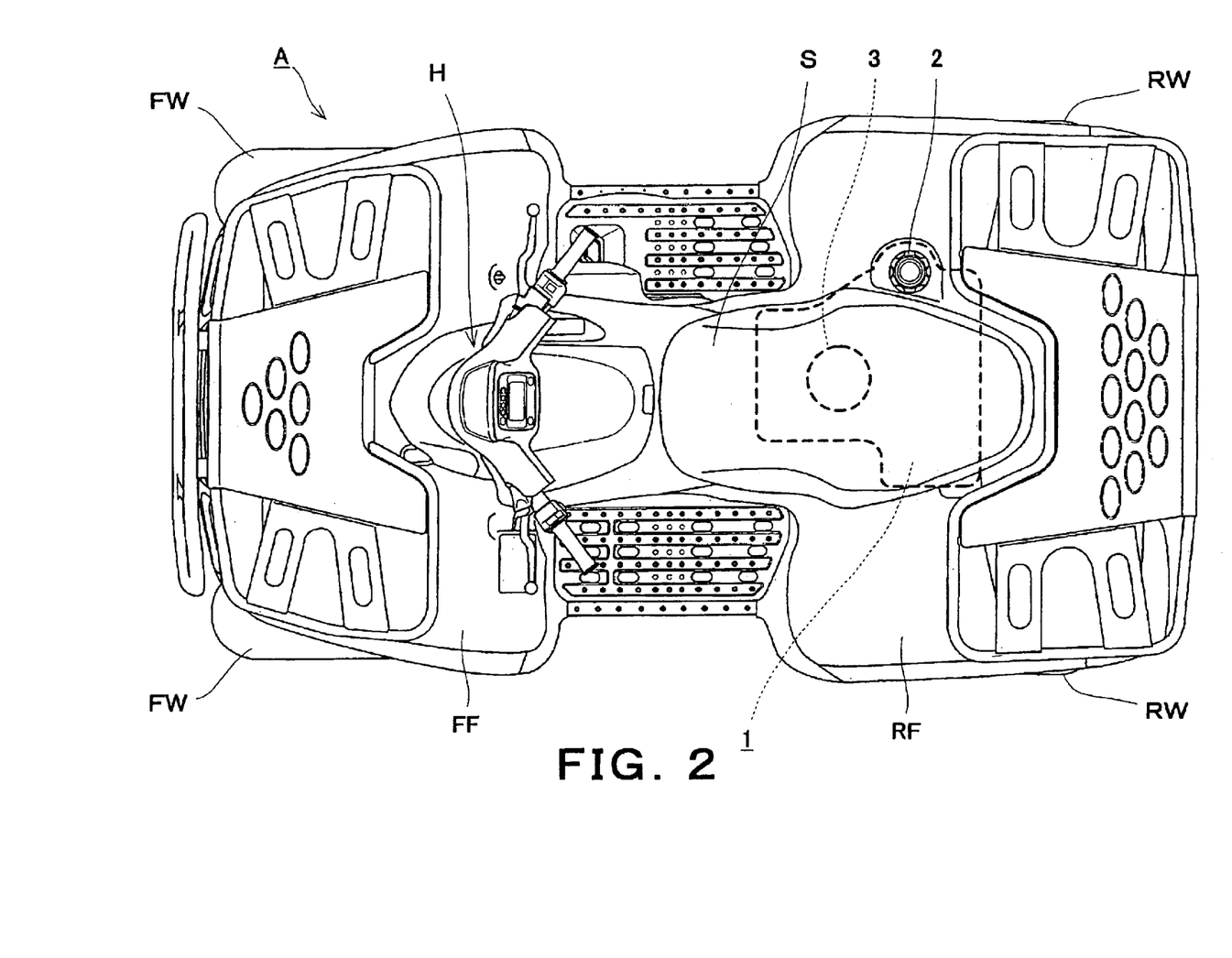
FIG. 2 is a plan view showing the entire configuration of the all terrain vehicle of FIG. 1.

FIG. 1 is a side view showing an entire configuration of the all terrain vehicle according to this embodiment and FIG. 2 is a plan view showing the entire configuration of the vehicle of FIG. 1.

Referring now to FIGS. 1 and 2, an all terrain vehicle A of this embodiment is provided with an engine E mounted at a central portion of the vehicle's body frame Fr comprised of a pipe member. A steering column (not shown) is rotatably supported at a front portion of the frame Fr so as to extend substantially vertically at a suitable caster angle. An upper end of the steering column is fixed to a bar handle H and a lower portion of the steering column is connected to front wheels FW for steering suspended from right and left sides of a front lower portion of the frame Fr by means of a pair of tie rods.

A rider straddles a straddle-type seat S mounted to a rear upper portion of the frame Fr, and grips and rotates the bar handle H around the steering column to steer the front wheels FW to the right or to the left.

Rear wheels RW having a common axle are provided on right and left sides of a rear portion of the frame Fr and are driven by the engine E through transmission and gears.

The engine E of the vehicle A according to this embodiment employs a V-type two cylinder engine. As shown in FIGS. 1 and 2, a fuel tank 1 molded by mainly using a polyethylene (P.E.) based material is mounted below the seat S and between the rear wheels RW.

Figure 3:
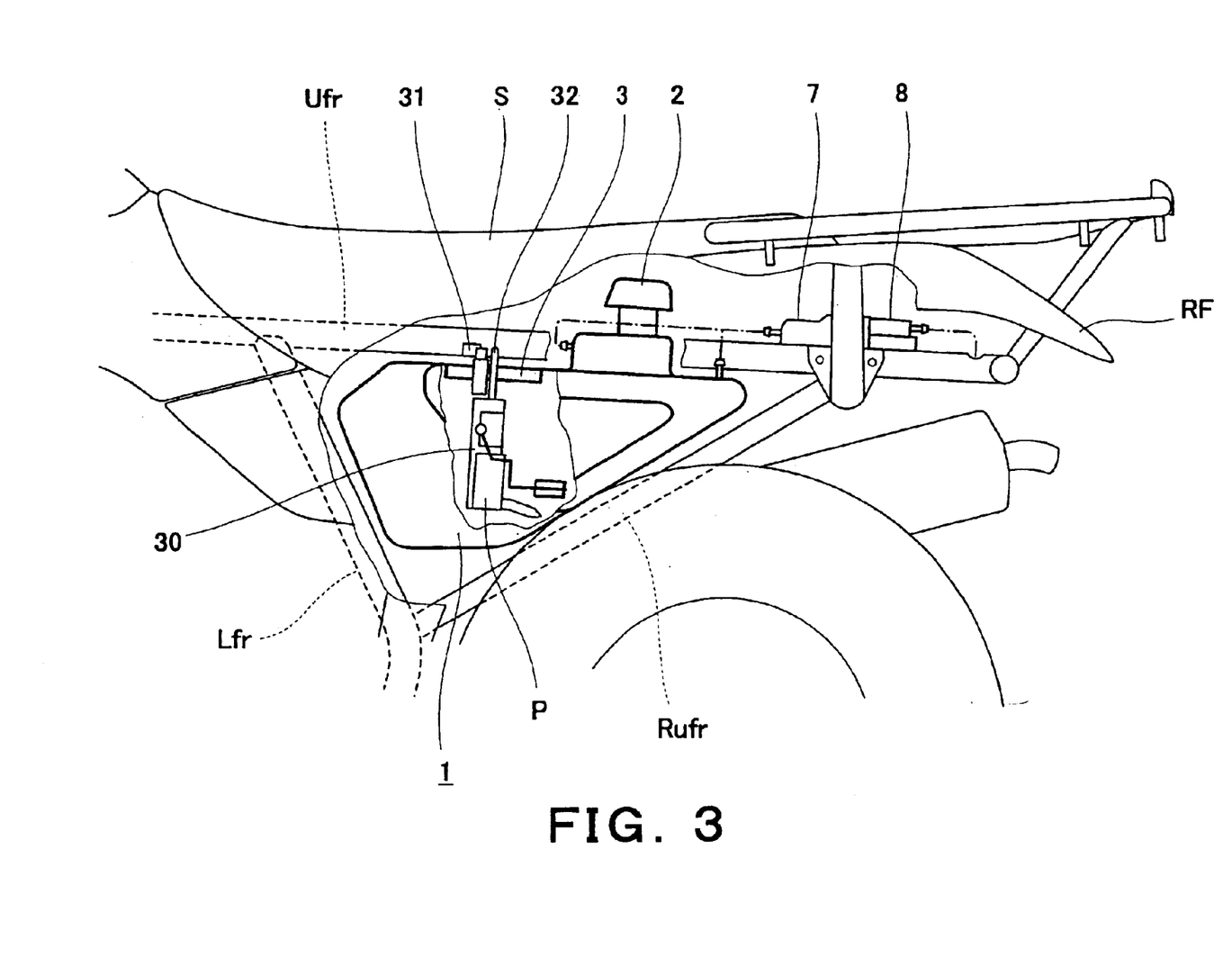
FIG. 3 is a partially-broken enlarged view of FIG. 1, showing a fuel tank and its vicinity.

As shown in FIG. 3, which is a partially-broken enlarged view of FIG. 1, the frame Fr of the vehicle A according to this embodiment has a double-cradle type frame structure. The fuel tank 1 is inverted-triangle shaped when seen in a side view so as to be accommodated in a space surrounded by upper frames Ufr, lower frames Lfr, and rear upper frames Rufr.

As shown in FIGS. 2 and 3, the fuel tank 1 is accommodated within a width of the seat S in the vicinity of a middle portion of the seat S when seen in a plan view and substantially T-shaped so as to be wide in the lateral direction between the rear wheels RW rearward of the seat S. A fuel inlet 10 (see FIG. 5) is provided on one side (e.g., right side) of a laterally extended rear portion of the T-shaped fuel tank such that it is exposed from the rear fender RF covering the rear wheels RW and the fuel tank 1 from above. A tank cap 2 is removably attached to the fuel inlet 10.

An opening (not shown) communicating with the fuel tank 1 is formed at the center of an upper face of the fuel tank 1. A cover 3 is attached to the opening. A fuel pump P of a built-in type (in-tank type) including a fuel gauge 30 of a float type is suspended from a lower face of the cover 3. A connector 31 is provided on an upper face of the cover 3 to connect the fuel pump P to an ECU (electric control unit which is not shown), a battery (not shown) or the like mounted in the vehicle A. A current corresponding to an instruction from the ECU is flowed to the fuel pump P through the connector 31 to cause the fuel pump P to operate, while a detection signal from the fuel gauge 30 is sent to the ECU through the connector 31. A fuel outlet pipe 32 penetrates through the cover 3. A lower end of the fuel outlet pipe 32 is connected to a fuel outlet (not shown) of the fuel pump P and an upper end thereof is connected to the carburetor (not shown) by means of a suitable oil-resistant hose (not shown).

The fuel pump P is adapted to suction the fuel inside the fuel tank 1 from a suction port in a lower portion thereof upon the flow of current and discharge the suctioned fuel to the outside of the fuel tank 1 through the fuel outlet pipe 32. The discharged fuel is supplied to the carburetor through the hose connected o the fuel outlet pipe 32 and mixed with an air independently taken into the carburetor, to be supplied as a fuel-air mixture necessary for combustion in the engine E.

Figure 4:
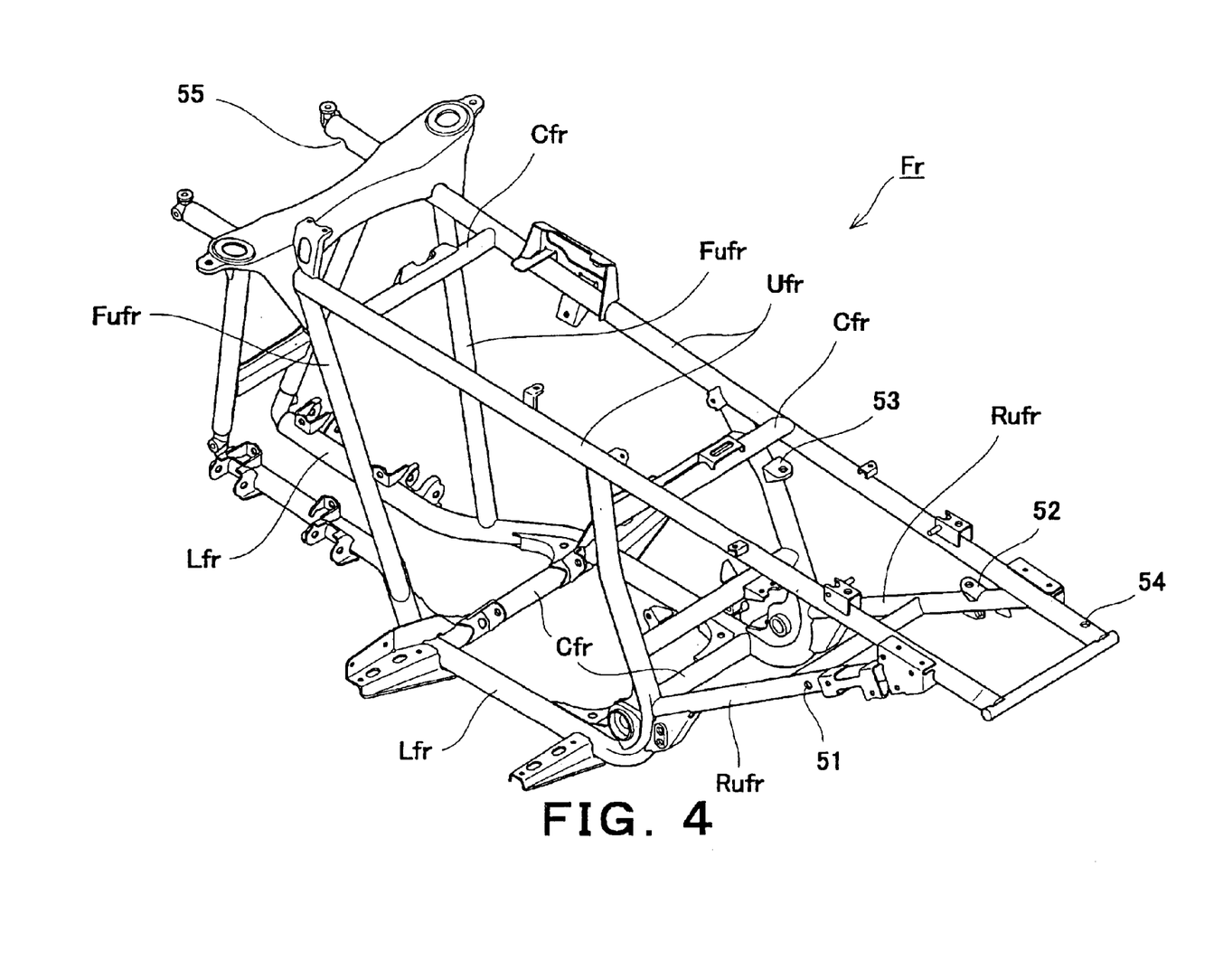
FIG. 4 is a perspective view showing an entire portion of the vehicle's body frame according to the embodiment when seen from rear on the left side.

As shown in FIG. 4 as the perspective view seen from rear on the left side, the body frame Fr comprises a pair of right and left upper frames Ufr extended over the entire length of the longitudinal direction in the upper portion of the vehicle, a pair of right and left lower frames Lfr forming a lower portion of the body frame Fr, a pair of right and left front upper frames Fufr respectively connecting front portions of the lower frames Lfr to front portion of the upper frames Ufr, a pair of right and left rear upper frames Rufr respectively connecting rear lower portions of the lower frames Lfr to the corresponding upper frames Ufr protruded rearwardly, and a plurality of cross frames Cfr connected to the right and left frames in the vehicle width direction.

Figure 5:
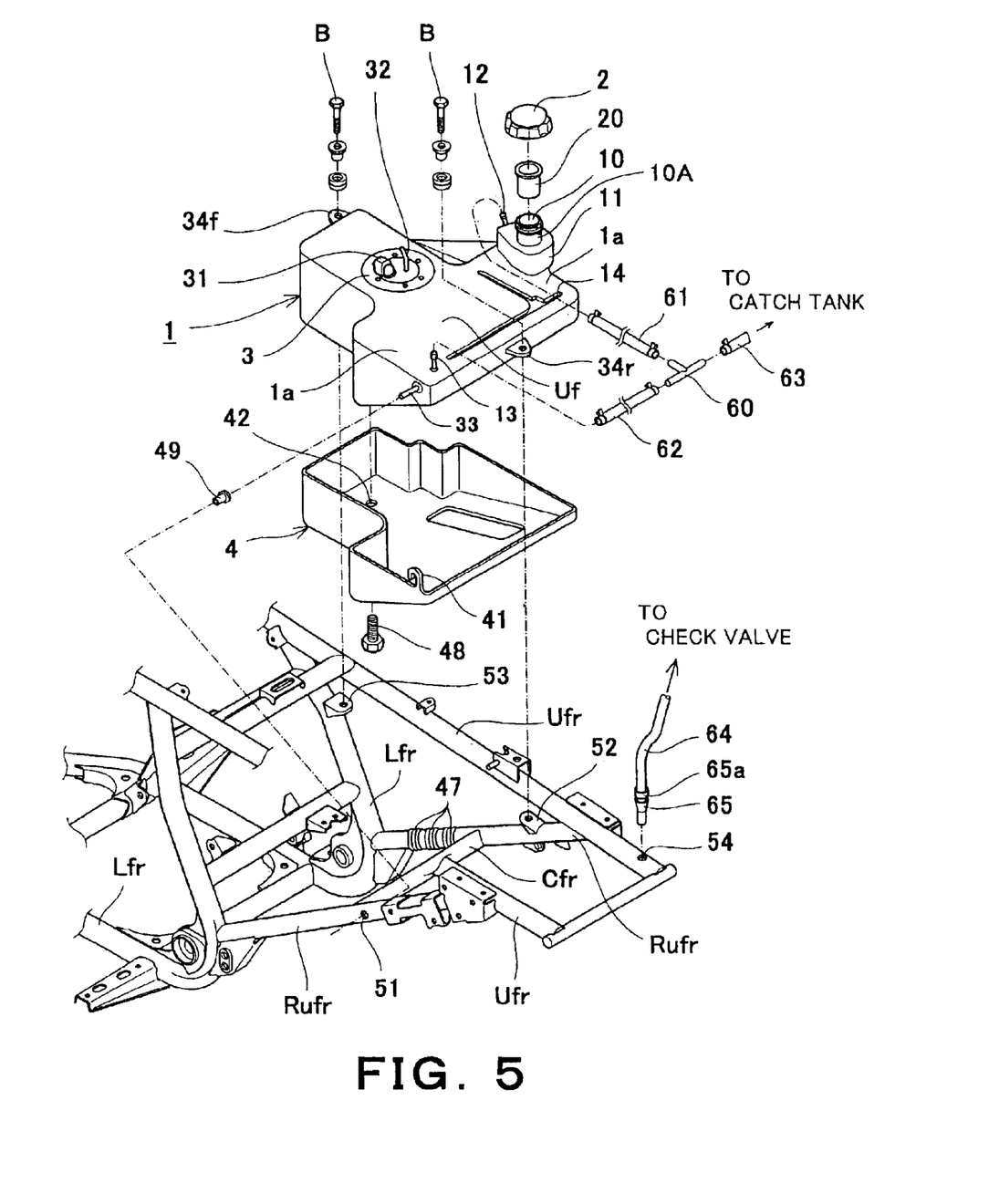
FIG. 5 is an exploded perspective view showing the fuel tank of FIG. 3 and a breather system thereof when the vehicle is seen from rear on the left side.

FIG. 5 shows a rear portion of the frame Fr of FIG. 4, that is, the position at which the fuel tank 1 is accommodated and its vicinity. The fuel tank 1 is covered with a tank protection cover 4 that is tray-shaped and made of polypropylene (P.P.) containing glass fibers. The tank protection cover 4 is fitted to a lower half portion of the fuel tank 1 from below. A boss 33 is provided on one side (e.g., left side) of a side face of a rear half portion of the fuel tank 1. A hook 41 is provided at a position of the tank protection cover 4 that corresponds to the boss 33. The hook 41 is engaged with the boss 33 from below. The tank protection cover 4 is fixed to the fuel tank 1 in such a manner that the hook 41 is engaged with the boss 33 by means of a rubber grommet 49 and a mounting screw 48 inserted into a hole 42 formed in the center of the front half portion of the cover 4, which screw is threadedly engaged with a female screw portion (not shown) embedded at the corresponding position of the fuel tank 1.

A portion of the lower face of the fuel tank 1, corresponding to one of the rear upper frames Rufr (e.g., right side upper frame) is protruded downwardly to some degrees (not shown). This protruded portion penetrates through the tank protection cover 4 in a corresponding rectangular lack portion and is placed on one of the rear upper frame Rufr from above. In this case, three rubber grommets 47 outerly fitted to the corresponding portion of the rear upper frame Rufr at suitable intervals serve as a cushion member for avoiding direct contact between the fuel tank 1 and the rear upper frame Rufr.

The fuel tank 1 is fixed to the frame Fr by means of the boss 33 and two hexagonal bolts B as described below. A portion of the boss 33 that is still protruded laterally with the hook 41 of the tank protection cover 4 engaged with the boss 33 is internally fitted into a penetrating hole 51 laterally formed in the corresponding rear upper frame Rufr. Flanges 34r, 34f are formed integrally with a rear face and a front face of the fuel tank 1 as corresponding to flanges 52, 53 welded at suitable vertical positions of the rear upper frame Rufr (the side on which the boss 33 is not engaged) and the rear portion of the lower frame Lfr on the same side. The hexagonal bolts B are inserted through holes respectively formed in the flanges 34r, 34f of the fuel tank 1 by means of washers, grommets, and the like, and are engaged with screw holes formed in the flange 52, 53.

Subsequently, a breather system for the fuel tank 1 according to this embodiment will be described in detail. As shown in FIG. 5, a rear portion of the fuel tank 1 is laterally extended, and the fuel inlet 10 to which the tank cap 2 is attached is provided in the upper portion of one of these extended portions 1a (e.g., right side). The fuel inlet 10 corresponds to an upper end of a cylindrical portion (so called "a filler neck" 10A) vertically provided on an upper face Uf of a main portion of the fuel tank 1. An air reservoir 11 having an inner space larger than the filler neck 10A of the fuel inlet 10 is extended such that it is protruded from the upper face Uf of the fuel tank 1 by a predetermined height. When the fuel is fully supplied into the fuel tank 1 (so called, filled up), a liquid face of the fuel is restricted by visual measurement by a lower end of a tubular baffle 20 inserted into the filler neck 10A to allow the fuel to be filled to the upper face Uf. Therefore, the filler neck 10A and the air reservoir 11 immediately below the filler neck 10A always contain air during a normal upright position of the vehicle A.

A nipple-shaped breather opening 12 is formed integrally with a front portion of the air reservoir 11 such that it is protruded outwardly, i.e., forwardly and slightly rightwardly. Another nipple-shaped breather opening 13 is formed integrally with a rear left end portion (extended portion 1a on the opposite side of the fuel inlet 10) of the upper face Uf of the fuel tank 1. Breather hoses 61, 62 are respectively outerly fitted and fixed to the breather openings 12, 13 which are spaced apart from each other in the right and left directions of the fuel tank 1 as well as in the longitudinal direction, and are integrally connected by using a T-shape joint so to have a predetermined length. The breather hoses 61, 62 and the joint 60 are accommodated in a T-shape concave groove 14 provided in the upper face Uf of the fuel tank 1. Another breather hose 63 is connected to a remaining opening (ambient side) of the joint 60 to allow the opening to communicate with a catch tank 7 made of polyethylene (P.E.) as described below.

Figure 6:
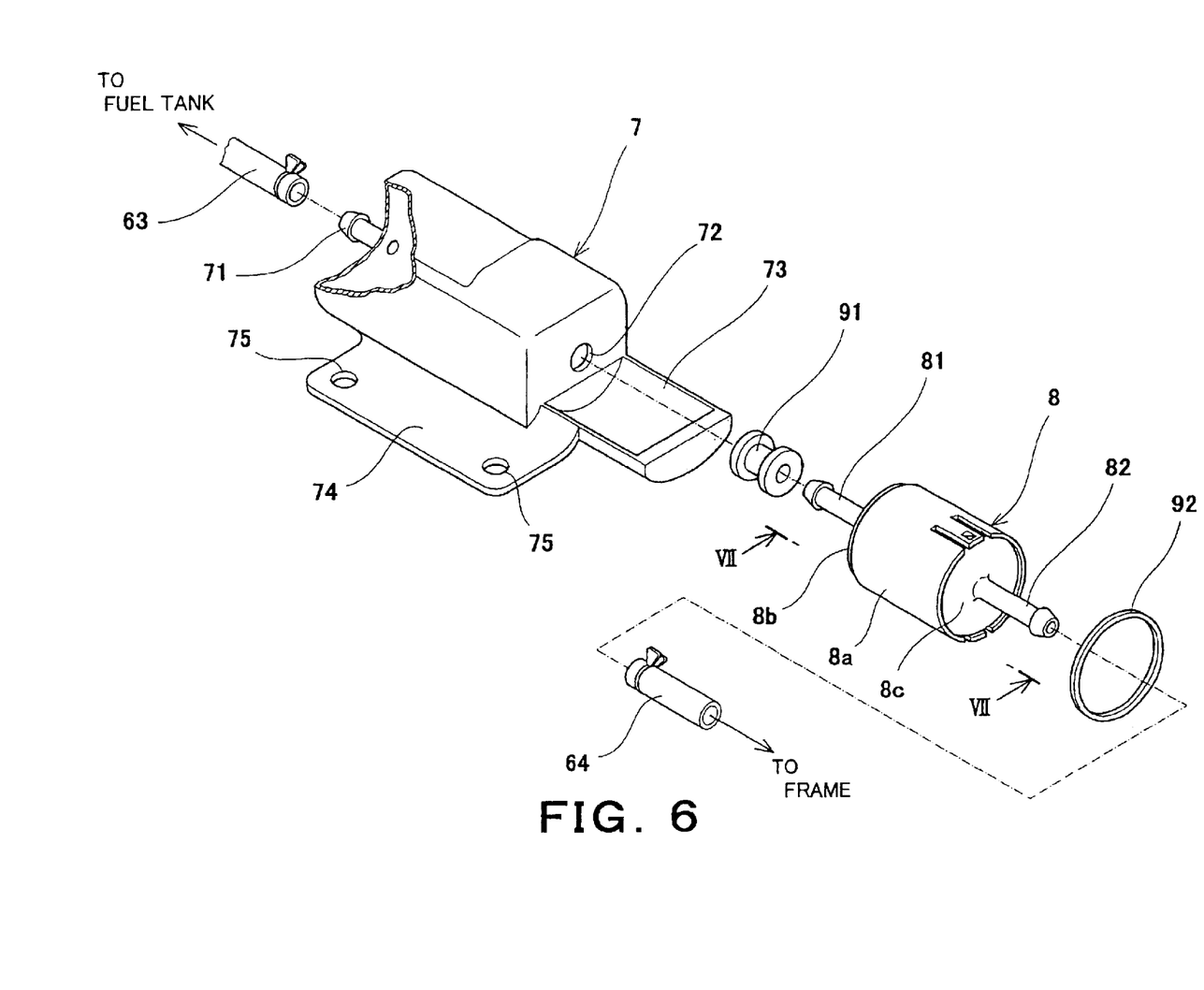
FIG. 6 is a perspective view showing structures of a catch tank and a check valve of FIG. 3.

Referring to FIG. 6, the catch tank 7 is shown as a horizontally elongated box shape. The catch tank 7 has a hollow inner portion and functions as a so-called "air reservoir" generally containing air. A nipple-shaped connector 71 for connection of the breather hose 63 from the T-shape joint 60 is provided on one of small side faces of the box shape. A connecting hole 72 for connection of the check valve 8 is formed in the other small side face. A semicylindrical receiving portion 73 having an end is formed protrusively from and integrally with a lower portion of the other small side face, for accommodating the check valve 8 from above.

An outer case of the check valve 8 is made of a polyacetal material. The outer case comprises a cylindrical body 8a and side walls 8b, 8c formed on the connecting side to the catch tank 7 and on the opposite side. A connector 81 is protruded from the side wall 8b on the connecting side of the catch tank 7. A bobbin-shaped rubber grommet 91 is outerly fitted to the connector 81, which is internally fitted to the connecting hole 72 of the catch tank 7. Thereby, a lower half portion of the cylindrical body 8a of the check valve 8 is accommodated in the receiving portion 73 of the catch tank 7. Then, a synthetic resin ring 92 is wound around the cylindrical body 8a accommodated in the receiving portion 73 so as to be integrally fixed to the catch tank 7.

A rectangular flange 74 is laterally protruded from a lower end portion of one of large side faces of the catch tank 7, and two mounting holes 75 are formed in the flange 74 so as to be spaced apart from each other in the longitudinal direction of the catch tank 7.

As shown in FIG. 3, the catch tank 7 and the check valve 8 integral with each other as described above are placed rearwardly of the fuel tank 1 and screwed to the upper side of the right-side upper frame Ufr by means of the two mounting holes 75 in this embodiment. The catch tank 7 and the check valve 8 are located at a position higher than the breather openings 12, 13 provided in the fuel tank 1.

As shown in FIG. 6, a connector 82 is provided so as to be protruded from the other side wall 8c of the check valve 8. One end of the breather hose 64 is connected to the connector 82. As shown in FIG. 5, an insertion portion 65 to be inserted into the upper frame Ufr is formed integrally with the other end of the breather hose 64. The insertion portion 65 is inserted into an insertion hole 54 from the upper side of the rear portion of the upper frame Ufr without penetrating to the lower side of the frame Ufr, and communicates with an inner space of the upper frame Ufr.

The insertion portion 65 is entirely tubular. An annular flange portion 65a for restricting the inserted depth of the insertion portion 65 into the upper frame Ufr is provided at the base thereof on the hose side. The face of the flange portion 65a of the insertion portion 65 on the tip side is concave so as to conform in shape to an outer peripheral face of the upper frame Ufr when the insertion portion 65 is inserted into the upper frame Ufr. The portion of the insertion portion 65 on the tip side that is spaced a distance equal to the thickness of the upper frame Ufr apart from the face of the flange portion 65a has a diameter slightly larger than an outer diameter of the breather hose 64 so as to conform to the diameter of the insertion hole 54 formed in the upper frame Ufr. The portion on a further tip side has a slightly larger diameter to prevent the insertion portion 65 from being disengaged from the insertion hole 54 formed in the upper frame Ufr after insertion. In other words, a groove portion fixed to the upper frame Ufr by inserting the insertion portion 65 into the insertion hole 54 formed in the upper frame Ufr is provided at the periphery of the tip end portion of the breather hose 64.

The portion on a still further tip side is tapered and has a size reduced as it is closer to the tip end to facilitate the insertion into the insertion hole 54. The tip end portion of this tapered portion is cylindrical and has a length for allowing the tip end of the inserted portion to be located substantially at the middle of the upper frame Ufr in the depth direction thereof.

In this embodiment, the insertion portion 65 of the breather hose 64 is inserted into the insertion hole 54 on the right side of the upper frame face of the upper frame Ufr, i.e., on the same side of the catch tank 7 and the check valve 8.

Figure 7:
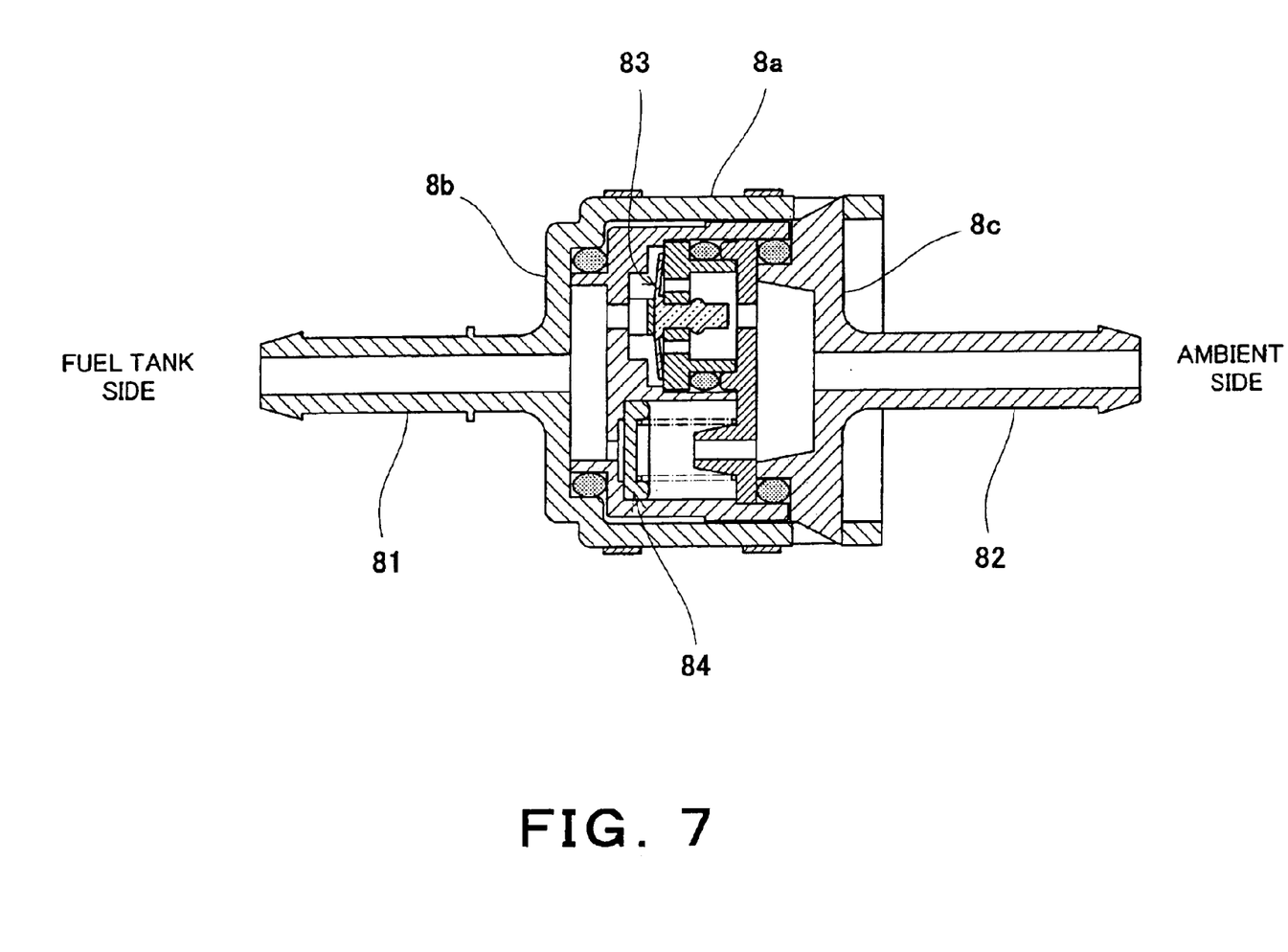
FIG. 7 is a side cross-sectional view showing an internal structure of the check valve of FIG. 6.

Check valve 8, as shown in the side cross-sectional view of FIG. 7, includes two chambers formed to enable independent communication, via separate routes through each of the chambers, between connector 81 on the catch tank 7 side (that is, on the fuel tank 1 side) and connector 82 on the ambient side (that is, on the upper frame Ufr side). A negative-pressure valve 83 is provided in one of the chambers and opened only when the internal pressure of the fuel tank 1 becomes negative to permit the flow of an ambient air (including vaporized fuel from the upper frame Ufr) into the fuel tank 1. A positive-pressure valve 84 is provided in the other chamber and opened only when the internal pressure of the fuel tank 1 becomes positive to permit the flow of the air (and the fuel) from the fuel tank 1. Thus, the ambient air and the air inside the fuel tank 1 are respectively flowed through the independent passages in the check valve 8.

As shown in FIG. 4, a vent hole 55 downwardly opened is formed at the front end of the upper frame Ufr communicating with the check valve 8. The vent hole 55 is located below the front fender FF covering the upper side of the front wheels FW and above an inner fender IF (see FIG. 1) provided in the vehicle body inwardly of the front wheels FW. The provision of the vent hole 55 at this position and downwardly opened can prevent the entry of dust, water splash or the like while the vehicle is traveling.

In the all terrain vehicle A comprising the above-described breather system of this embodiment, the air to the fuel tank 1 is taken in from the vent hole 55 provided at front end of the upper frame Ufr and supplied from the rear end of the upper frame Ufr to the T-shape joint 60 through the check valve 8 and the catch tank 7. At the T-shape joint 60, the air flow is divided into two directions and the air is supplied through one or both of the breather openings 12, 13 of the fuel tank 1.

For instance, in a case where the front portion of the vehicle becomes higher than the rear portion thereof when the vehicle is traveling on an ascending slope road, and the fuel in the fuel tank 1 occludes the rear breather opening 13, the air can be taken into the fuel tank 1 through the front breather opening 12.

Conversely, in a case where the front portion of the vehicle becomes lower than the rear portion thereof when the vehicle is traveling on a descending slope road, and the fuel in the fuel tank 1 occludes the front breather opening 12, the air can be taken into the fuel tank 1 through the rear breather opening 13.

Further, in a case where the vehicle is inclined to the right, and the fuel in the fuel tank 1 occludes the right (front) breather opening 12, the air can be taken into the fuel tank 1 through the left breather opening 13.

Conversely, in a case where the vehicle is inclined to the left, and the fuel in the fuel tank 1 occludes the left (rear) breather opening 13, the air can be taken into the fuel tank 1 through the right breather opening 13.

Thus, in this embodiment, since the breather openings 12, 13 of the fuel tank 1 are respectively provided on the right front side and the left rear side, the breather can function reliably only by these two breather openings 12, 13 when the vehicle is inclined to the front or rear side, or to the right or left side.

In the breather system according to the present invention, the placement of and the number of the breather openings is not limited to the above-described embodiment. Alternatively, three or more breather openings may also be placed preferably in pairs such that they are spaced apart at opposite positions of the fuel tank 1 according to possible inclination directions of the vehicle and the degree of inclination.

Even if the internal pressure of the fuel tank 1 is increased by some causes such as inclination or vibration of the vehicle and the fuel is pushed out from one or both of the breather openings 12, 13 through the breather hoses 61, 62, 63, the pushed-out fuel is temporarily stored in the catch tank 7 to prevent the flow to the outside. Even when the fuel exceeding the capacity of the catch tank 7 is pushed out, this fuel in the catch tank 7 flows through the check valve 8 and is temporarily stored in the upper frame Ufr and a vaporized part of the stored fuel is suctioned back into the fuel tank 1 through the check valve 8.

Since the catch tank 7 is positioned so as to be higher than the breather openings 12, 13 in this embodiment, the fuel falls by its gravity through the breather hoses 61, 62, 63 and is returned to the fuel tank 1 even in the condition in which the internal pressure of the fuel tank 1 does not become negative.

In the breather system according to the present invention, since it is not necessary to provide the breather openings 12, 13 in the exposed tank cap 2 and these openings can be placed below the rear fender RF, the breather hoses or the like do not interfere with the rider.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within meters and bounds of the claims, or equivalence of such meters and bounds thereof are therefore intended to be embodied by the claims.

What is claimed is:

1. A breather system for a fuel tank comprising:

a plurality of openings provided in the fuel tank;

breather hoses respectively connected to the openings;

a collecting pipe integrally connecting the breather hoses;

a check valve connected to an ambient side of the collecting pipe; and a catch tank interposed between the collecting pipe and the check valve;

wherein the catch tank is provided integrally with the check valve; and wherein the plurality of openings are provided on opposite sides of the fuel tank so as to be spaced apart from each other.

2. A four wheeled all terrain vehicle, comprising:

a body frame constituting the vehicle's body;

a straddle seat mounted to an upper portion of the body frame;

a fuel tank placed below the seat; and a breather system for the fuel tank, wherein the breather system includes:

a plurality of breather openings provided in an upper portion of the fuel tank such that they are spaced apart from each other on right and left sides of the vehicle;

breather hoses respectively connected to the breather openings;

a collecting pipe integrally connecting the breather hoses; and a check valve connected to an ambient side of the collecting pipe.

3. The four wheeled all terrain vehicle according to claim 2, wherein an ambient-side opening end of the check valve communicates with a space in the frame of a pipe shape so as to be opened to an ambient air.

4. The four wheeled all terrain vehicle according to claim 3, wherein the frame to which the check valve is connected is an upper frame that forms an upper portion of the body frame and supports the seat.

5. The four wheeled all terrain vehicle according to claim 2, further comprising:

a fuel inlet provided in a portion formed by upwardly extending part from an upper surface of the fuel tank on one of right and left sides of the fuel tank;

an air reservoir provided below the fuel inlet, the air reservoir having a first breather opening to which a first breather hose is connected; and a second air breather opening provided in the upper face of the fuel tank on the other side of the fuel tank, to which a second breather hose is connected.

6. The four wheeled all terrain vehicle according to claim 2, further comprising:

a catch tank interposed between the collecting pipe and the check valve and connected to the collecting pipe and the check valve.

7. The four wheeled all terrain vehicle according to claim 6, wherein the catch tank is placed at a position higher than the first and second breather openings.

8. The four wheeled all terrain vehicle according to claim 6, wherein the catch tank and the check valve are integrally provided.

9. The four wheeled all terrain vehicle according to claim 6, wherein the catch tank and the check valve are directly connected to each other.

10. The four wheeled all terrain vehicle according to claim 2, wherein the frame has a structure of a double-cradle type.

11. The four wheeled all terrain vehicle according to claim 10, wherein the fuel tank is substantially accommodated in a space surrounded by upper frames, lower frames, and rear upper frames.

12. The four wheeled all terrain vehicle according to claim 2, wherein the collecting pipe is a T-shape joint.

13. The four wheeled all terrain vehicle according to claim 3, further comprising:

an insertion portion with barb for preventing disengagement from the frame, having a breather hose connecting the frame and the ambient-side opening end of the check valve, and the insertion portion being formed integrally with a connected end of the breather hose to the frame.

14. The four wheeled all terrain vehicle according to claim 2, wherein the check valve has two chambers, in which an air-intake side chamber and a discharge side chamber are independently formed.

* * * * *